US012595782B2

(12) United States Patent
March Nomen

(10) Patent No.: US 12,595,782 B2
(45) Date of Patent: Apr. 7, 2026

(54) WIND TURBINE BLADE AND METHOD FOR MANUFACTURING A WIND TURBINE BLADE

(71) Applicant: Siemens Gamesa Renewable Energy Innovation & Technology, S.L., Sarriguren (ES)

(72) Inventor: Victor March Nomen, Sant Cugat del Valles (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 0 days.

(21) Appl. No.: 18/857,316

(22) PCT Filed: Mar. 31, 2023

(86) PCT No.: PCT/EP2023/058539
§ 371 (c)(1),
(2) Date: Oct. 16, 2024

(87) PCT Pub. No.: WO2023/208522
PCT Pub. Date: Nov. 2, 2023

(65) Prior Publication Data
US 2025/0277483 A1 Sep. 4, 2025

(30) Foreign Application Priority Data

Apr. 29, 2022 (EP) ..................................... 22382412

(51) Int. Cl.
*F03D 80/30* (2016.01)
*B29C 65/34* (2006.01)
(Continued)

(52) U.S. Cl.
CPC ............ *F03D 80/301* (2023.08); *B29C 65/34* (2013.01); *B29L 2031/085* (2013.01)

(58) Field of Classification Search
CPC .. B29L 2031/085; F03D 80/30; F03D 80/301; F03D 13/10; F03D 1/0675;
(Continued)

(56) References Cited

U.S. PATENT DOCUMENTS 10,125,744 B2 * 11/2018 March Nomen ....... F03D 80/30
10,161,381 B2 * 12/2018 Tobin .................... B29C 65/148
(Continued)

FOREIGN PATENT DOCUMENTS

EP 3670169 A1 6/2020
EP 4000877 A1 5/2022
(Continued)

OTHER PUBLICATIONS

PCT International Search Report and Written Opinion of International Searching Authority mailed May 4, 2023 corresponding to PCT International Application No. PCT/EP2023/058539 filed Mar. 31, 2023.

*Primary Examiner* — Eric J Zamora Alvarez
(74) *Attorney, Agent, or Firm* — Schmeiser, Olsen & Watts LLP

(57) ABSTRACT

A wind turbine blade is provided, including: a first and a second blade component connected with each other in an overlap region by thermal welding, a resistive element arranged between the first and second blade components in the overlap region as a remnant of the thermal welding, the resistive element having a first and a second terminal, a lightning conductor electrically connected with each of the first and second terminals, and a surge protection device, wherein one of the first and second terminals is electrically connected with the lightning conductor via the surge protection device. The resistive element which was used for the (Continued)

welding process and is left in the blade as a remnant of the welding process can be integrated into the lightning protection system of the blade.

15 Claims, 8 Drawing Sheets

(51) Int. Cl.
B29L 31/08            (2006.01)
F03D 1/06            (2006.01)

(58) Field of Classification Search
CPC ....................... B29D 99/0025; B29D 99/0028; B29C 65/34; B29C 66/61; F05B 2230/232; F05B 2230/234; B32B 2262/106
See application file for complete search history.

(56)                         References Cited

U.S. PATENT DOCUMENTS

| | | | |
|---|---|---|---|
| 2013/0170992 A1* | 7/2013 | Loewe | .................. F03D 1/0675 |
| | | | 29/611 |
| 2017/0074238 A1 | 3/2017 | Tobin et al. | |
| 2020/0171768 A1* | 6/2020 | Murray | ............... B29C 66/1122 |
| 2020/0198264 A1* | 6/2020 | Christiansen | ......... B29C 70/342 |

FOREIGN PATENT DOCUMENTS

| | | |
|---|---|---|
| EP | 4027010 A1 | 7/2022 |
| GB | 2493001 A | 1/2013 |

* cited by examiner

FIG 11

WIND TURBINE BLADE AND METHOD FOR MANUFACTURING A WIND TURBINE BLADE

CROSS-REFERENCE TO RELATED APPLICATIONS

This application is a national stage of PCT Application No. PCT/EP2023/058539, having a filing date of Mar. 31, 2023, which claims priority to EP application Ser. No. 22/382,412.9, having a filing date of Apr. 29, 2022, the entire contents both of which are hereby incorporated by reference.

FIELD OF TECHNOLOGY

The following relates to a wind turbine blade and method for manufacturing a wind turbine blade.

BACKGROUND

Wind turbine blades are commonly made from fiber-reinforced resin. To facilitate manufacture, individual blade components are often pre-manufactured and connected with each other afterwards. For example, a pressure side and a suction side shell of a blade are manufactured separately and are then connected with each other at the leading and trailing edges. Further, for example, a shear web is manufactured separately and is then connected to a pressure side and a suction side shell of a blade. Known methods of connecting pre-manufactured blade components with each other include adhesive processes as well as infusion of a dry fiber lay-up in a connection region with resin. Further, US 2020/0171768 A1 discloses thermal welding for joining blade components.

SUMMARY

An aspect relates to an improved wind turbine blade and an improved method for manufacturing a wind turbine blade.

Accordingly, a wind turbine blade is provided. The wind turbine blade comprises:

a first and a second blade component connected with each other in an overlap region by thermal welding, a resistive element arranged between the first and second blade components in the overlap region as a remnant of the thermal welding, the resistive element having a first and a second terminal, a lightning conductor electrically connected with each of the first and second terminals, and a surge protection device, wherein one of the first and second terminals is electrically connected with the lightning conductor via the surge protection device.

Connecting the first and second blade components by thermal welding provides a faster connection method compared to a laminate joint because curing of an epoxy resin is not required. Further, an advantage of thermal welding compared to a glue joint is that an adhesive which adds significant weight to the blade can be avoided.

Further, the resistive element which was used for the welding process and is left in the blade as a remnant of the welding process can be integrated into the lightning protection system of the blade. By connecting the resistive element at its first and second terminals to the lightning conductor, flashovers during lightning between the resistive element and the lightning conductor can be prevented. In embodiments, in the case of high voltages at the lightning conductor caused by a lightning strike of the blade, the surge protection device opens a pathway for the lightning current to flow via the resistive element. Hence, large voltage differences between the resistive element and the lightning conductor are prevented. Thus, uncontrolled current flows such as flashovers and arcing between the resistive element and the lightning conductor are avoided.

The wind turbine blade is part of a rotor of a wind turbine. The wind turbine is an apparatus to convert the wind's kinetic energy into electrical energy. The wind turbine comprises, for example, a rotor having one or more of the blades connected each to a hub, a nacelle including a generator, and a tower holding, at its top end, the nacelle. The tower of the wind turbine may be connected via a transition piece to a foundation of the wind turbine, such as a monopile in the seabed or a concrete foundation.

The wind turbine blade, e.g., its root section, is fixedly or rotatably connected to the hub. Apart from a (cylindrical) root section, the wind turbine blade is formed aerodynamically. The wind turbine blade comprises, for example, a pressure side (upwind side) and a suction side (downwind side). The pressure side and the suction side are connected with each other at a leading edge and a trailing edge. The pressure and suction sides and the leading and trailing edges define an airfoil of the wind turbine blade.

The wind turbine blade has a shell made, for example, from a fiber-reinforced resin. The blade shell is, for example, manufactured by arranging fiber lay-up in a mold, infusing the fiber lay-up with resin, and curing the resin. The blade shell surrounds, for example, an interior cavity of the blade. The wind turbine blade further comprises, for example, one or more shear webs connecting the blade shells of the pressure side and the suction side in the interior cavity of the blade. The shear web provides shear strength to the blade.

A pressure side shell, suction side shell, the one or more shear webs and/or other blade components may be pre-manufactured separately. Then, the pre-manufactured blade components (e.g., a first and a second blade component) may be joined with each other, for example, by thermal welding.

Thermal welding includes, for example, thermal resin welding of weldable resin such as thermoplastic resin or weldable thermoset resin. Thermal welding is, for example, thermoplastic welding.

The resistive element is, in particular, an electrically conductive element. The resistive element can produce heat by a current that is applied to the resistive element and that is flowing between the first and second terminals of the resistive element. The resistive element is, in particular, a heating element. The heat produced by the resistive element depends on the electrical resistance of the resistive element and the amount of current and/or voltage applied to the resistive element.

The resistive element can be made of a metal. For example, the resistive element is made of copper. Alternatively, the resistive element can be made of carbon fibers.

The resistive element is arranged between the blade components such that it is sandwiched between the blade components in the overlap region.

The overlap region is a region in which a portion of the first blade component overlaps with a portion of the second blade component. The overlap region is a joining region of the first and second blade components.

During manufacture, a thermoplastic resin or weldable thermoset resin may be placed between the first and second blade components in the overlap region, e.g., in contact with a surface of the first and/or second blade component and/or the resistive element. When the resistive element is heated up by applying an electrical current through the resistive element, the thermoplastic resin or weldable thermoset resin melts and/or softens and joins the blade components.

The lightning conductor is a down conductor of a lightning protection system of the blade. The lightning conductor is, for example, arranged parallel to a longitudinal direction of the blade. In the manufactured state of the wind turbine, the lightning conductor is, for example, electrically connected at a first end thereof with a ground potential and is connected at a second end thereof with one or more air termination elements of the lightning protection system.

One of the first and second terminals being electrically connected with the lightning conductor via the surge protection device means that only one of the first and second terminals is electrically connected with the lightning conductor via the surge protection device. The other one of the first and second terminals is electrically connected with the lightning conductor without an intercalated surge protection device.

The first terminal of the resistive element is, in particular, electrically connected with a first connection portion of the lightning conductor. Further, the second terminal of the resistive element is electrically connected with a second connection portion of the lightning conductor, the first and second connection portions being separated from each other.

According to an embodiment, the surge protection device is configured to:

provide a closed electrical connection between the respective terminal of the resistive element and the lightning conductor for lightning protection when a voltage applied to the surge protection device exceeds a threshold voltage, and provide an electrical isolation between the respective terminal of the resistive element and the lightning conductor for thermal welding of the first and second blade components when the applied voltage is at or below the threshold voltage.

Thus, during manufacture of the blade, the electrical connection of the resistive element with the lightning conductor for lightning protection can be already established, in particular before the thermal welding process. Nevertheless, the resistive element can still be used during manufacture as a heating element for the thermal welding process.

A voltage applied to the surge protection device during a lightning strike usually exceeds the threshold voltage such that the surge protection device acts as electrical connector.

Further, a voltage applied to the surge protection device during the thermal welding process is usually much lower than the threshold voltage such that the surge protection device acts as electrical isolator.

The lightning conductor is, for example, arranged in the interior cavity of the blade shell. The lightning conductor is, for example, arranged at the first and/or second blade component and/or at a shear web of the blade.

According to an embodiment, only one of the first and second terminals is connected to the lightning conductor via a surge protection device and the other one of the first and second terminals is connected to the lightning conductor by an electrical wire.

In embodiments, the other one of the first and second terminals is connected to the lightning conductor by only an electrical wire, i.e., without an intercalated surge protection device.

According to an embodiment, the resistive element is an elongated element extending in a longitudinal direction and having a first and a second end with respect to its longitudinal direction, and the first terminal is arranged at the first end and the second terminal is arranged at the second end.

Having an elongated resistive element (i.e., an elongated conductive element) in the blade bears the risk of large voltage difference between the first and second ends of the resistive element during lightning conditions. By connecting the first and second ends of the elongated resistive element with the lightning conductor, flashovers between the resistive element and the lightning conductor can be better prevented.

The length of the resistive element in the longitudinal direction is, for example, 3 meter or more, 5 meter or more, 7 meter or more and/or 10 meter or more.

According to an embodiment, the overlap region of the first and second blade components is an elongated region arranged (i.e., extending) parallel to a longitudinal direction of the blade and/or the resistive element is an elongated element arranged (i.e., extending) parallel to the longitudinal direction of the blade.

The elongated resistive element is, for example, arranged such that it is extending parallel to the lightning conductor.

According to an embodiment, the wind turbine blade comprises two or more of the resistive elements electrically connected to each other in series at their respective first and/or second terminals.

By using more than one resistive element, a joint between the first and second blade components over a large bonding line can be realized by thermal welding. Further, by using more than one resistive element, the voltage required for heating a respective one of resistive elements can be kept small (e.g., at or below 690 V and/or 220 V).

The wind turbine blade may also comprise more than one surge protection device.

According to an embodiment, each of two neighboring ones of the two or more resistive elements are electrically connected with each other at their neighboring terminals, and the neighboring terminals are electrically connected with the lightning conductor by a common conductive wire and/or by a common surge protection device.

Thus, the number of conductive wires, conductive connections and/or surge protection devices can be reduced.

According to an embodiment, the wind turbine blade comprises an even number n of the resistive elements and a number p of the surge protection devices, wherein p is an even number fulfilling the equation $p=(n/2)$ or p is an odd number fulfilling the equation $p=(n/2)+1$.

In an embodiment, p is fulfilling the equation $p=(n/2)$ because in this case a smaller number of surge protection devices is necessary.

According to an embodiment, the wind turbine blade comprises an odd number m of the resistive elements and a number q of the surge protection devices, wherein q is an even number fulfilling the equation $q=[(m-1)/2]+1$.

According to an embodiment, the first blade component and/or the second blade component comprises a blade half shell, a lower blade shell, an upper blade shell, a pressure side shell, a suction side shell, a structural element, a reinforcement beam, a web and/or a shear web.

According to an embodiment, the threshold voltage is 1.5 kV or larger, 2 kV or larger, 2.5 kV or larger, 3 kV or larger, 10 kV or larger and/or 30 kV or larger.

According to a further aspect, a method for manufacturing a wind turbine blade is provided. In embodiments, the method comprises:

a) arranging a first and a second blade component such that they overlap with each other in an overlap region, wherein a resistive element is arranged between the first and second blade components in the overlap region, the resistive element has a first and a second terminal, a lightning conductor is arranged such that it is electrically connected with each of the first and second terminals, and the lightning conductor is electrically connected to one of the first and second terminals via a surge protection device, and b) connecting the first and second blade components to each other by thermal welding including supplying an electrical current between the first and second terminals of the resistive element for heating the resistive element.

In step a), a weldable resin such as thermoplastic or weldable thermoset resin may be arranged between the first and second blade components.

According to an embodiment of the further aspect, a voltage applied at the surge protection device in step b) is at or below a threshold voltage such that:

the surge protection device provides an electrical isolation between the one of the first and second terminals of the resistive element and the lightning conductor, and the electrical current for heating the resistive element is supplied through the electrical connection between the other one of the first and second terminals of the resistive element and the lightning conductor.

According to an embodiment of the further aspect, each of the first and second terminals are electrically connected in step b) with a power source for supplying the electrical current between the first and second terminals.

According to an embodiment of the further aspect, the method comprises the step of removing after step b) the electrical connection between each of the first and second terminals and the power source.

The embodiments and features described with reference to the wind turbine blade of the present invention apply mutatis mutandis to the method of the present invention.

Further possible implementations or alternative solutions of embodiments of the invention also encompass combinations—that are not explicitly mentioned herein—of features described above or below with regard to the embodiments. The person skilled in the conventional art may also add individual or isolated aspects and features to the most basic form of embodiments of the invention.

BRIEF DESCRIPTION

Some of the embodiments will be described in detail, with references to the following Figures, wherein like designations denote like members, wherein:

FIG. 11 shows a flowchart illustrating a method for manufacturing a wind turbine blade of the wind turbine of FIG. 1 according to an embodiment.

DETAILED DESCRIPTION

Figure 1:
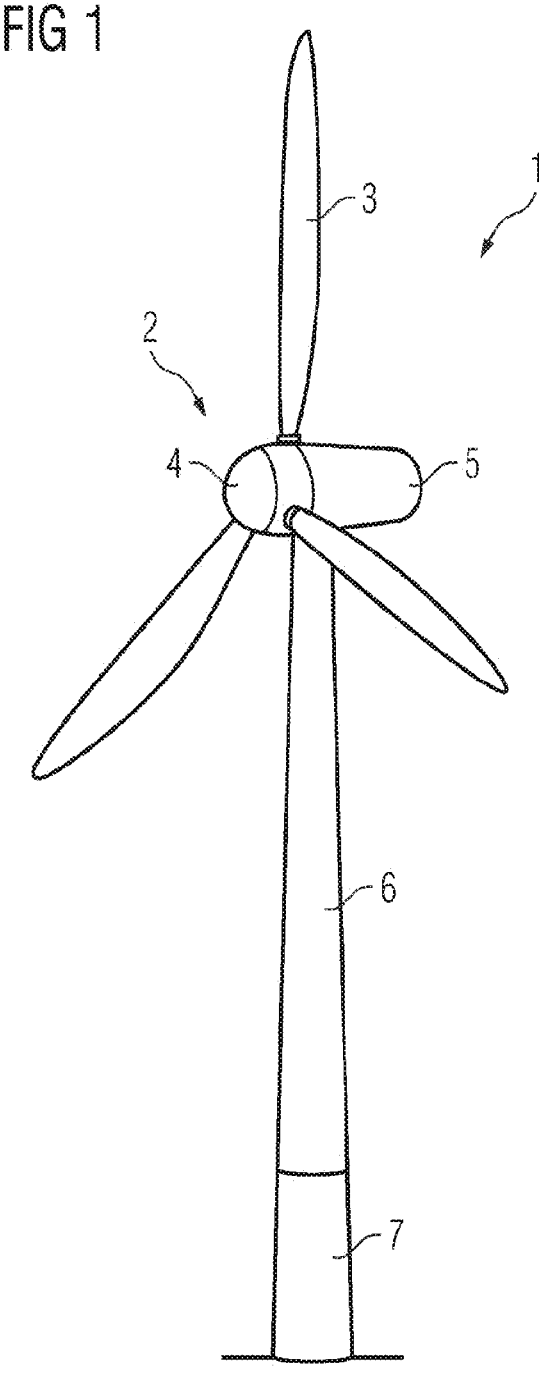
FIG. 1 shows a wind turbine according to an embodiment.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a monopile or concrete foundation. The foundation 7 is connected to and/or driven into the ground or seabed.

Figure 2:
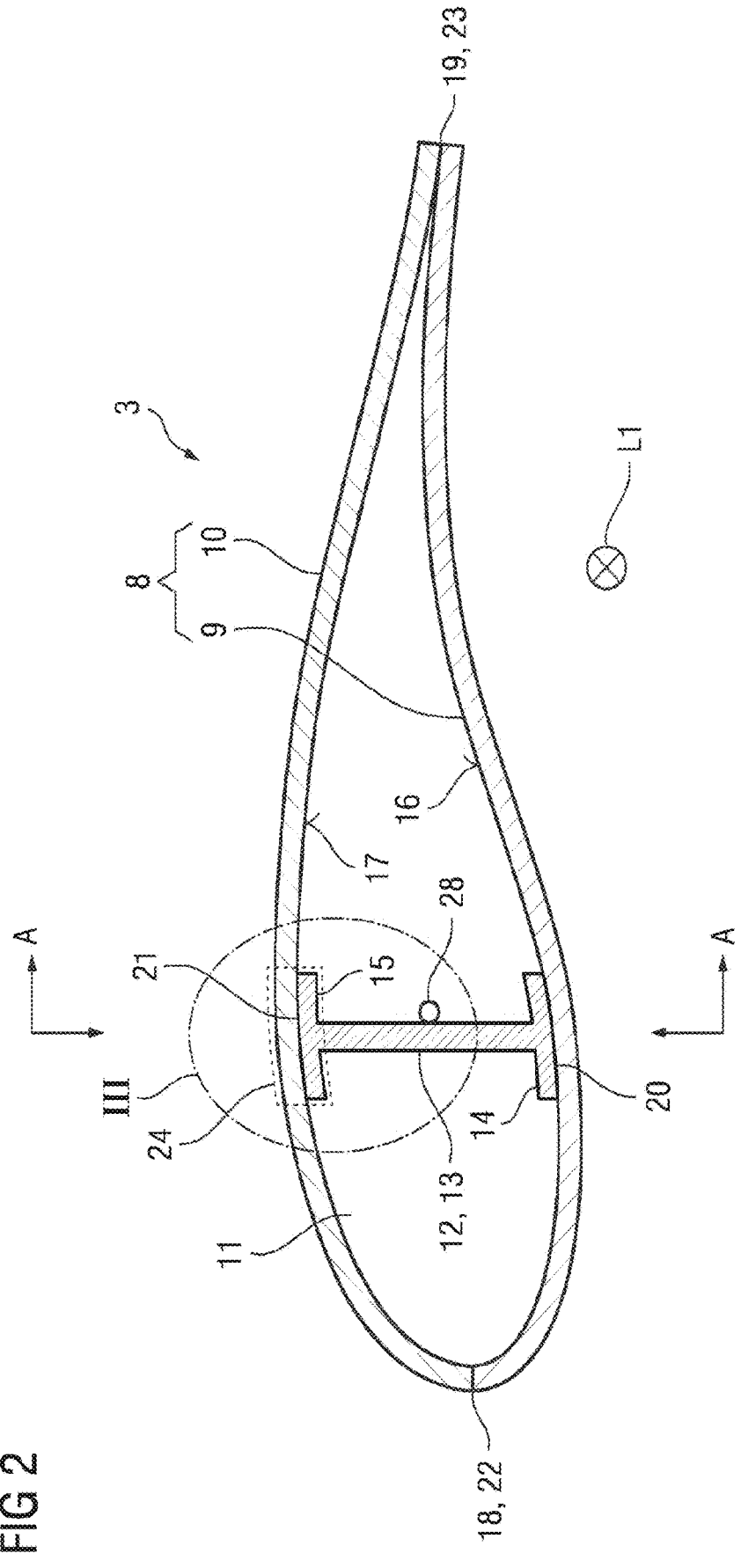
FIG. 2 shows a cross-section view of a wind turbine blade of the wind turbine of FIG. 1 according to an embodiment.

FIG. 2 shows a cross-section view of a wind turbine blade 3 of the wind turbine 1 of FIG. 1.

The blade 3 comprises a blade shell 8 including a lower blade shell 9 and an upper blade shell 10. The lower and upper blade shells 9, 10 are lower and upper blade shells with respect to a manufacturing position. The lower blade shell 9 is, for example, a pressure side shell and the upper blade shell 10 is, for example, a suction side shell or vice versa. The blade shell 8 surrounds an interior cavity 11 of the blade 3.

The blade 3 further comprises one or more structural elements 12 running in a longitudinal direction L1 of the blade 3. The longitudinal direction L1 of the blade 3 is, for example, pointing from a root of the blade 3 to a tip of the blade 3. The structural element 12 comprises fiber composite material, in particular glass fiber mats. The structural element 12 can be a shear web, a spar cap or the like. In FIG. 2, a shear web 13 is shown as an example for a structural element 12. Although not shown in the figures, the blade 3 can also comprise more than one shear web 13. The shear web 13 connects the blade shells 9, 10 of the pressure side and the suction side in the interior cavity 11 of the blade 3 and is providing shear strength to the blade 3. The shear web 13 comprises two flanges 14, 15 that are attached to inner surfaces 16, 17 of the shells 9, 10, respectively.

The blade 3 is, for example, assembled from several pre-manufactured blade components such as the lower blade shell 9, the upper blade shell 10, the structural element 12 and/or the shear web 13. Such pre-manufactured blade components may, for example, be connected to each other at joints 18, 19, 20, 21 by thermal welding. For example, the lower blade shell 9 is connected to the upper blade shell 10 in a first and a second joint 18, 19 by thermal welding. The first and second connection regions 18, 19 are, in particular, arranged at a leading edge 22 and a trailing edge 23 of the blade 3. Furthermore, the structural element 12 such as the shear web 13 is connected to the lower blade shell 9 in a third joint 20 by thermal welding and/or is connected to the upper blade shell 10 in a fourth joint 21 by thermal welding.

In the following, exemplarily, the fourth joint 21 between the shear web 13 and the upper blade shell 10 by thermal welding is described. However, the following description may also be applied to one, more or all of the other joints 18, 19, 20.

Figure 3:
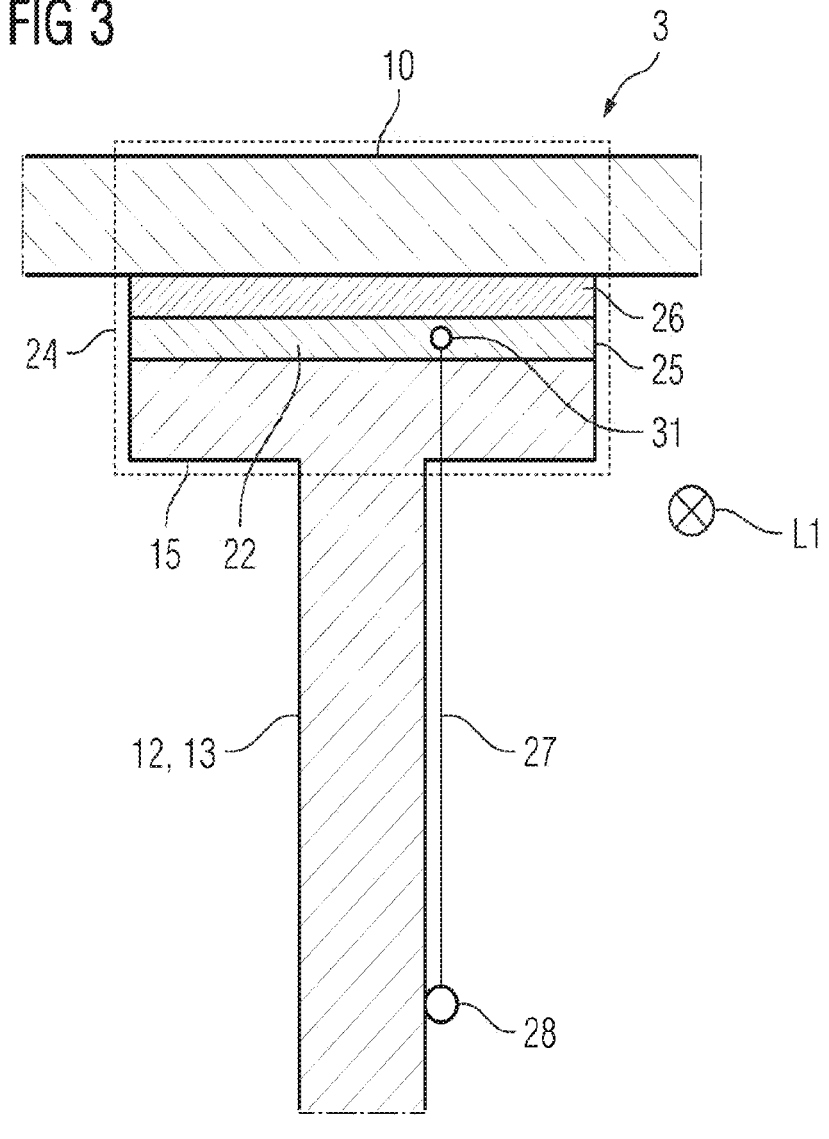
FIG. 3 shows a detail view of portion III of FIG. 2.

FIG. 3 shows a detailed view of portion III of FIG. 2. Visible in FIG. 3 is a portion of the shear web 13 including its upper flange 15 and a portion of the upper blade shell 10. The shear web 13 is an example of a first blade component. Further, the upper blade shell 10 is an example of a second blade component. The shear web 13 and the upper blade shell 10 are connected with each other in an overlap region 24 by thermal welding. For providing the necessary heat for thermal welding, the blade 3 comprises a resistive element 25. The resistive element 25 is arranged between the shear web 13 (in particular the upper flange 15 of the shear web 13) and the upper blade shell 10 in the overlap region 24 during manufacture. Further, as can be seen in FIG. 3, the resistive element 25 remains after the manufacturing process in the blade 3. Further indicated in FIG. 3 is that during the manufacturing process a weldable resin 26 is arranged between the shear web 13 (in particular the upper flange 15 of the shear web 13) and the upper blade shell 10 in the overlap region 24.

The resistive element 25 which is used as a heating element for the welding process during manufacture is left in the blade 3 as a remnant of the welding process. Further, the resistive element 25 is electrically connected (reference sign 27) to a lightning conductor 28 and is, thus, integrated into a lightning protection system (not shown) of the blade 3.

Figure 4:
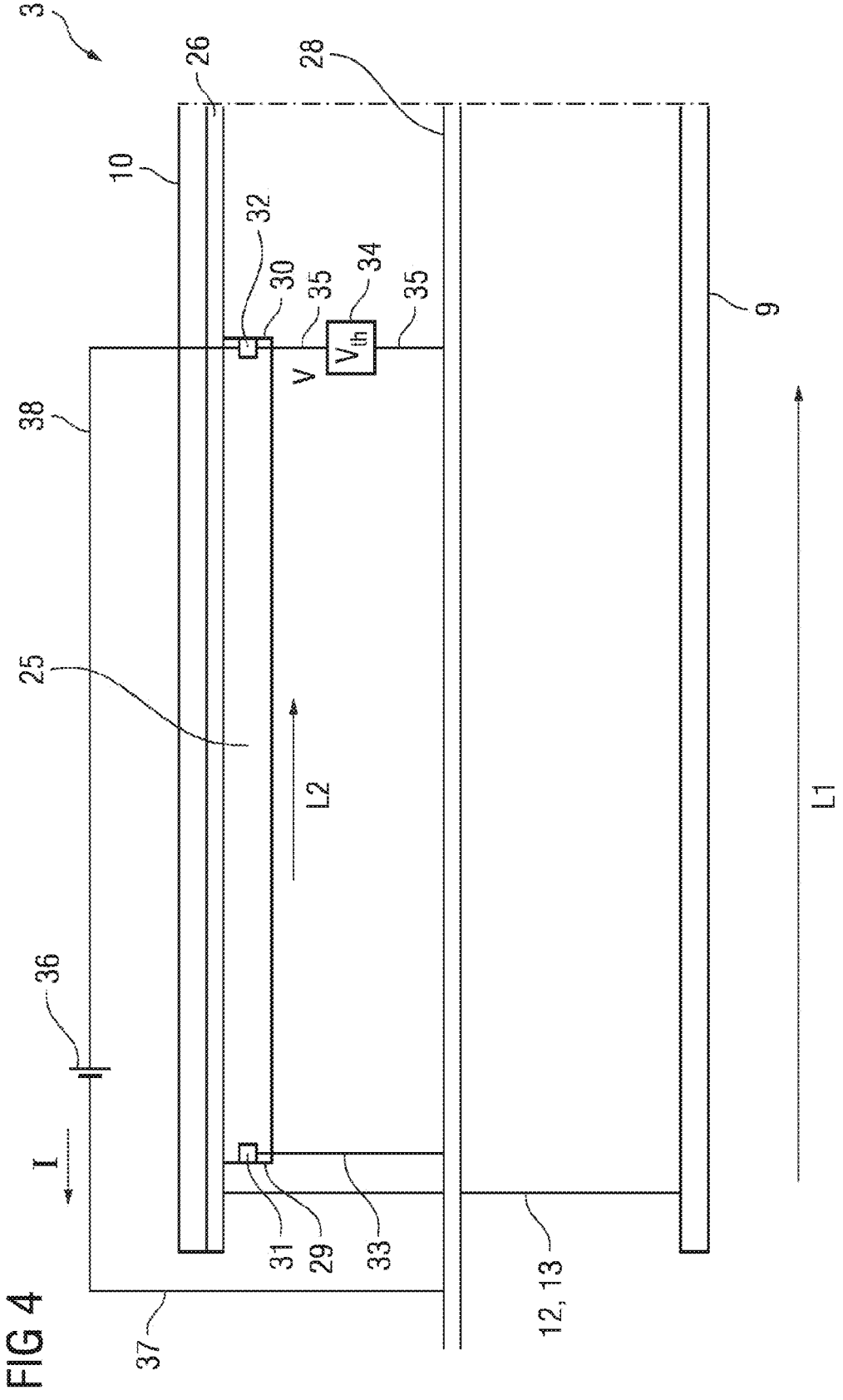
FIG. 4 illustrates electrical connections of a resistive element of the blade of FIG. 2 during thermal welding of blade components of the blade.

FIG. 4 illustrates electrical connections of the resistive element 25 during thermal welding of blade components, i.e., of the shear web 13 and the upper blade shell 10. FIG. 4 shows a cross-section along line A-A in FIG. 2.

The resistive element 25 is an elongated element extending in a longitudinal direction L2 and parallel to the longitudinal direction L1 of the blade 3. The resistive element 25 has a first end 29 and a second end 30 with respect to the longitudinal directions L1, L2.

Further, the resistive element 25 has first and second terminals 31, 32 for electrical connection. In embodiments, the first terminal 31 is arranged at the first end 29 of the resistive element 25. Further, the second terminal 32 is arranged at the second end 30 of the resistive element 25.

In order to prevent flashovers during operation of the wind turbine 1 between the resistive element 25 remaining in the blade 3 after manufacture and the lightning conductor 28, the first and second terminals 31, 32 of the resistive element 25 are electrically connected to the lightning conductor 28. In embodiments, one of the first and second terminals 31, 32 of the resistive element 25 is electrically connected to the lightning conductor 28 by an electrical wire 33. Further, the other one of the first and second terminals 31, 32 of the resistive element 25 is electrically connected to the lightning conductor 28 via a surge protection device 34 and a further electrical wire 35. In the example of FIG. 4, the first terminal 31 is electrically connected to the lightning conductor 28 by the electrical wire 33, and the second terminal 32 is electrically connected to the lightning conductor 28 via the surge protection device 34.

The surge protection device 34 is configured to provide a closed electrical connection between the second terminal 32 of the resistive element 25 and the lightning conductor 28 when a voltage V applied to the surge protection device 34 exceeds a threshold voltage $V_{th}$. Since a voltage V applied to the surge protection device 34 during a lightning strike usually exceeds the threshold voltage $V_{th}$, the surge protection device 34 acts as electrical connector in this case.

Further, the surge protection device 34 is configured to provide an electrical isolation between the second terminal 32 of the resistive element 25 and the lightning conductor 28 when the applied voltage V is at or below the threshold voltage $V_{th}$.

In this manner, during manufacture of the blade 3, the electrical connection (33, 34, 35) of the resistive element 25 with the lightning conductor 28 for lightning protection can be already established (in particular before the thermal welding process). Nevertheless, the resistive element 25 can still be used during manufacture as a heating element for the thermal welding process.

FIG. 4 shows the electrical connections of the resistive element 25 during the welding process. Each of the first and second terminals 31, 32 is electrically connected with a power source 36 for supplying electrical current I between the first and second terminals 31, 32 for heating the resistive element 25. In embodiments, the first terminal 31 is electrically connected by the electrical wire 33 to the lightning conductor 28 and the lightning conductor 28 is electrically connected by a further electrical wire 37 to the power source 36. Further, the second terminal 32 is electrically connected by a further electrical wire 38 to the power source 36. Since the voltage V applied to the surge protection device 34 during the thermal welding process is lower than the threshold voltage $V_{th}$, the surge protection device 34 acts as an electrical isolator in this case.

After the thermal welding process, the electrical connection between each of the first and second terminals 31, 32 and the power source 36 are removed. For example, the electrical wires 37 and 38 are disconnected from the first and second terminals 31, 32, respectively.

The blade 3 may also comprise two or more of the resistive elements 25 electrically connected to each other in series, as shown in FIGS. 5 to 10. Using more than one resistive element 25 allows an easier heating of the resistive element even when the thermal welding process is carried out for a long bondline. Specially, since a length of the blade 3 can be as large as 100 meter and more, using several resistive elements 25 is desired.

As shown in FIGS. 5 to 10, different electrical connections of the resistive element 25 are possible depending on the number n, m of resistive elements 25 connected in series and the number p, q of applied surge protection devices 34.

Figure 9:
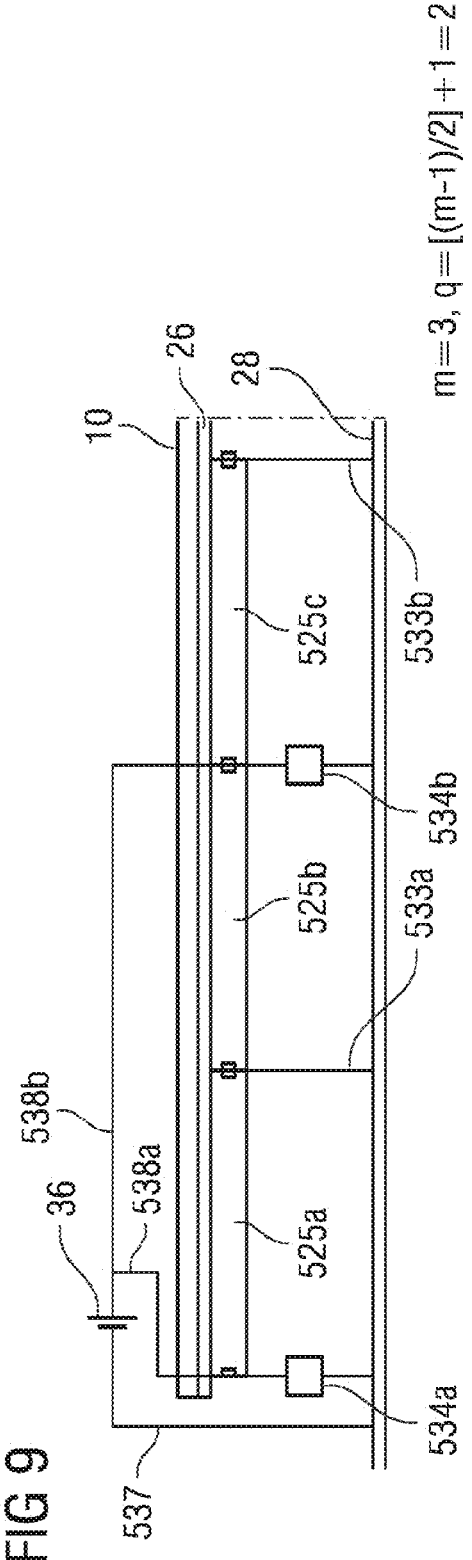
FIG. 9 shows a view similar as FIG. 4 but for an embodiment of a blade comprising three resistive elements.
Figure 10:
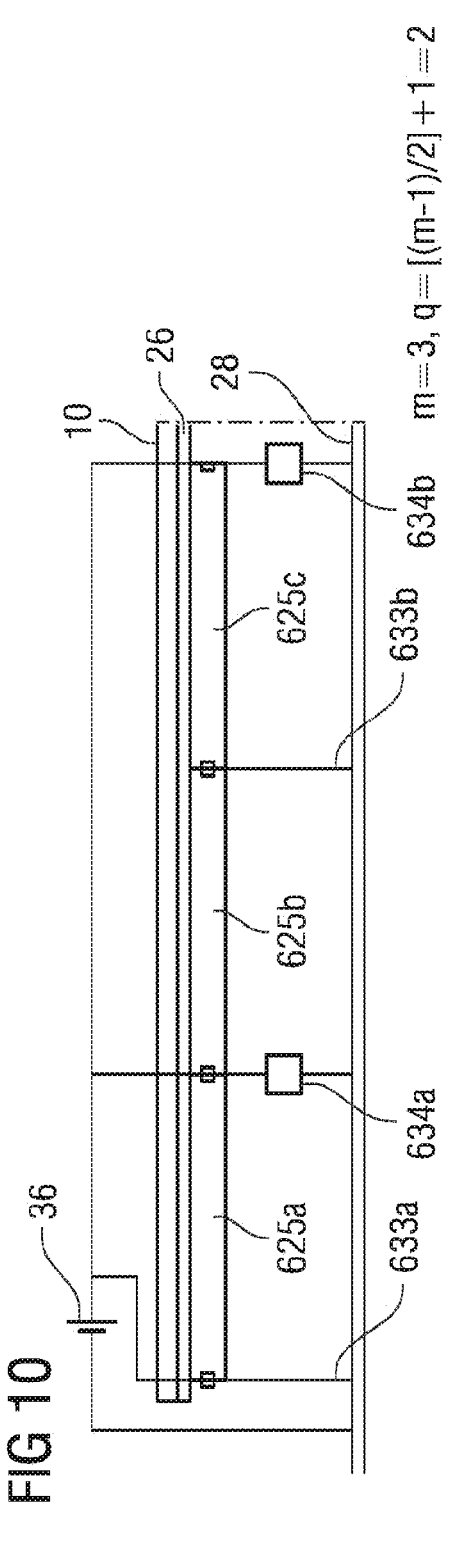
FIG. 10 shows a view similar as FIG. 9 but for a variant of the electrical connection.

FIGS. 5 to 8 show examples with an even number n of resistive elements 25. FIGS. 9 and 10 show examples with an odd number m of resistive elements 25.

Figure 5:
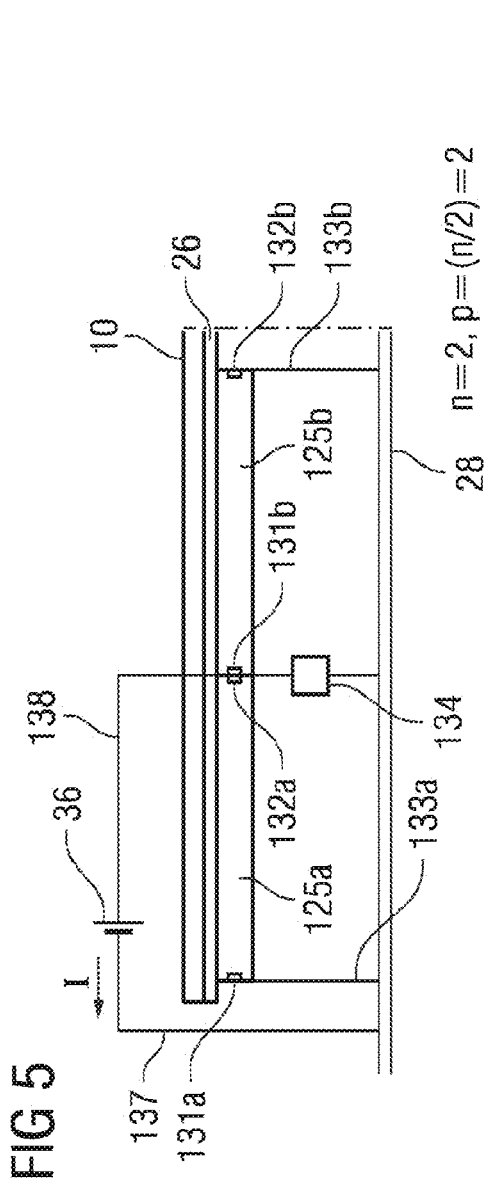
FIG. 5 shows a view similar as FIG. 4 but for an embodiment of a blade comprising two resistive elements.

FIG. 5 shows an example of two resistive elements 125a, 125b connected with each other in series at their neighboring terminals 132a, 131b.

For lightning protection during operation of the wind turbine 1, a first resistive element 125a is electrically connected at its first terminal 131a via an electrical wire 133a to the lightning conductor 28. Further, the neighboring terminals 132a, 131b of the first and second resistive elements 125a, 125b (i.e., the second terminal 132a of the first resistive element 125a and the first terminal 131b of the second resistive element 125b) are electrically connected via a common surge protection device 134 to the lightning conductor 28. Furthermore, the second resistive element 125b is electrically connected at its second terminal 132b via an electrical wire 133b to the lightning conductor 28. These electrical connections are, in particular, established before the thermal welding process.

For thermal welding, additionally, the lightning conductor 28 is electrically connected by an electrical wire 137 to the power source 36. Further, the neighboring terminals 132a, 131b of the first and second resistive elements 125a, 125b are connected by a common electrical wire 138 to the power source 36.

The surge protection device 134 acts as isolator for the voltage applied by the power source 36 (e.g., less than 690 V). Hence, an electrical current I is flowing from the power source 36 via the electrical wire 137, the lightning conductor 28, the electrical wire 133a, the first resistive element 125a and the electrical wire 138 back to the power source 38. Thereby, the first resistive element 125a is heated.

Furthermore, an electrical current I is flowing from the power source 36 via the electrical wire 137, the lightning conductor 28, the electrical wire 133b, the second resistive element 125b and the electrical wire 138 back to the power source 38. Thereby, the second resistive element 125b is heated.

In embodiments, for two resistive elements 125a, 125b only one surge protection device 134 is required.

Figure 6:
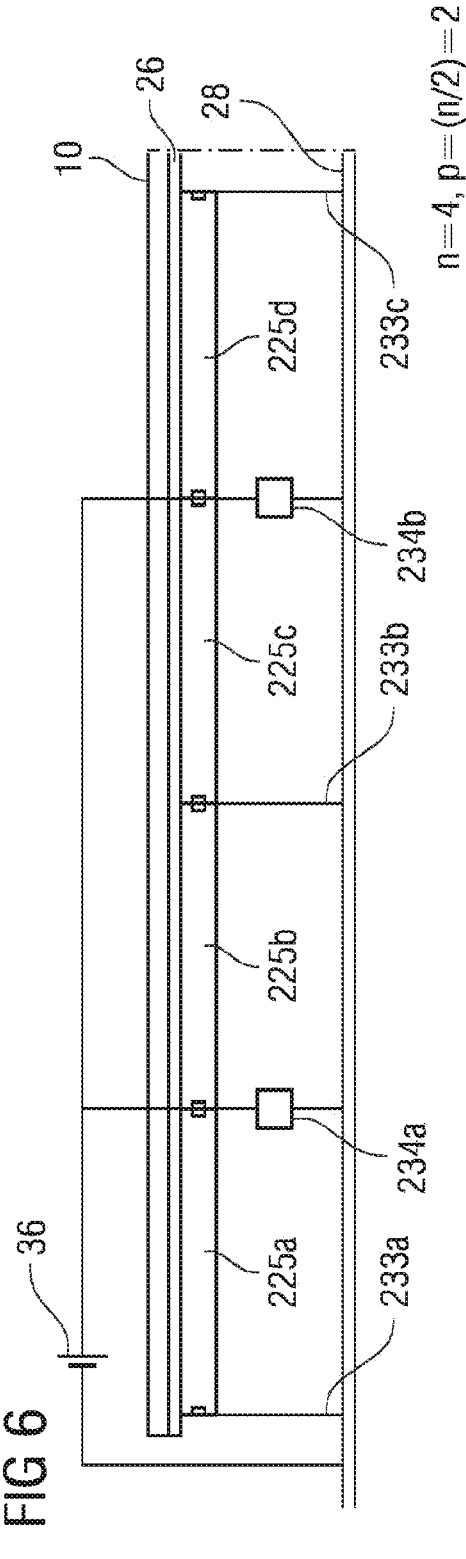
FIG. 6 shows a view similar as FIG. 4 but for an embodiment of a blade comprising four resistive elements.

FIG. 6 shows an example of four resistive elements 225a, 225b, 225c, 225d connected with each other in series at their respective terminals. In this case two surge protection devices 234a, 234b and three electrical wires 233a, 233b, 233c are used for electrically connecting the resistive elements 225a, 225b, 225c, 225d to the lightning conductor 28.

In embodiments, for four resistive elements 225a, 225b, 225c, 225d only two surge protection devices 234a, 234b are required.

In embodiments, in the examples of FIGS. 5 and 6, the number of resistive elements 125a, 125b, 225a-225d is even and the number p of required surge protection devices 134, 234a, 234b fulfills the equation p=(n/2).

Figure 7:
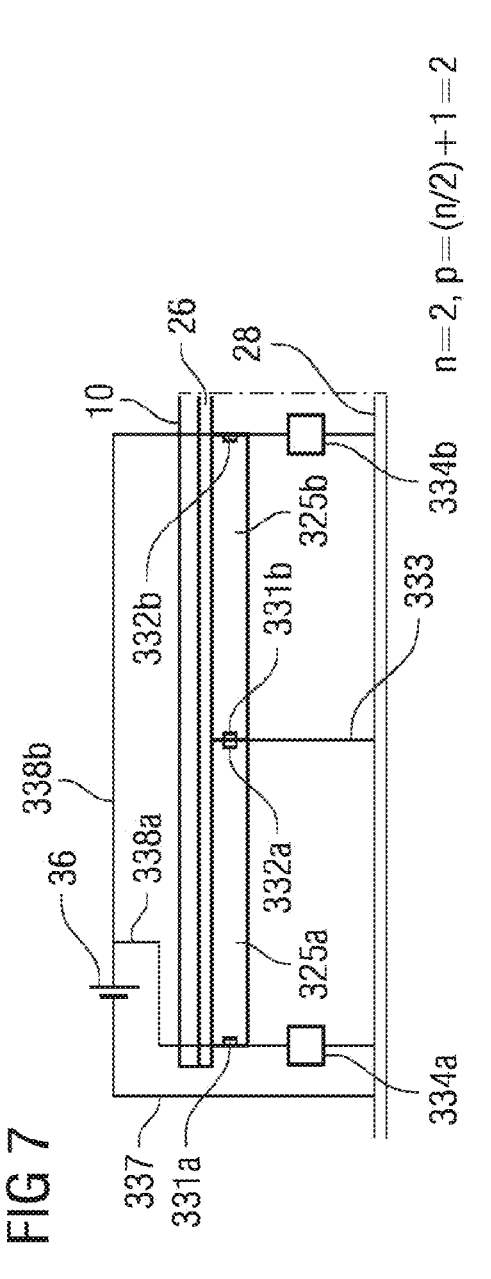
FIG. 7 shows a view similar as FIG. 5 but for a variant of the electrical connection.
Figure 8:
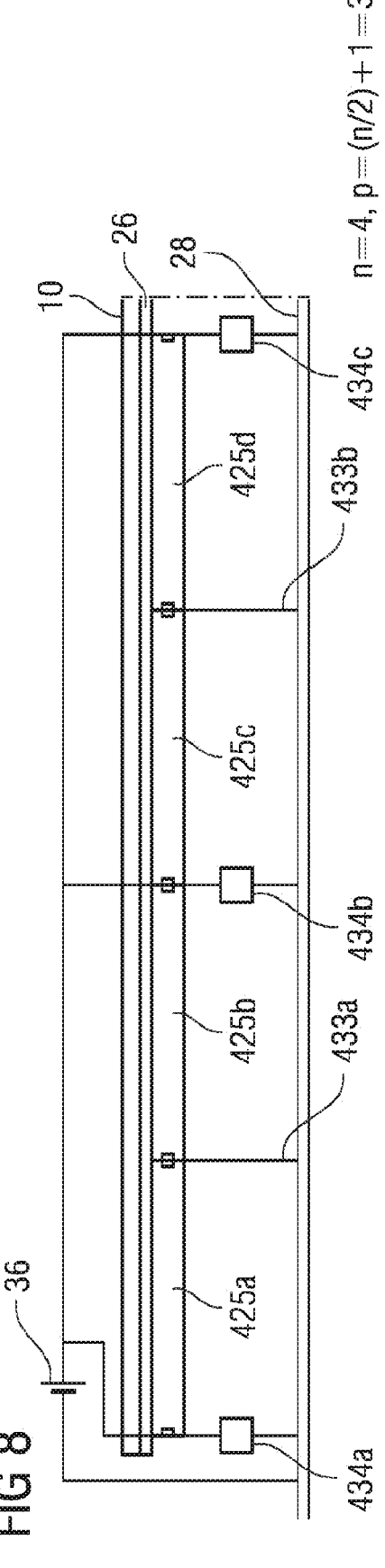
FIG. 8 shows a view similar as FIG. 6 but for a variant of the electrical connection.

FIGS. 7 and 8 show examples for an even number n of resistive elements 325a, 325b, 425a-425d for which the number p of required surge protection devices 334a, 334b, 434a-434c is an odd number fulfilling the equation p=(n/2)+1.

In the example of FIG. 7, for lightning protection during operation of the wind turbine 1, a first resistive element 325a is electrically connected at its first terminal 331a via a surge protection device 334a to the lightning conductor 28. Further, the neighboring terminals 332a, 331b of the first and second resistive elements 325a, 325b are electrically connected via a common electrical wire 333 to the lightning conductor 28. Furthermore, the second resistive element 325b is electrically connected at its second terminal 332b via another surge protection device 334b to the lightning conductor 28. These electrical connections are, in particular, established before the thermal welding process.

For thermal welding, additionally, the power source 36 is connected by an electrical wire 337 to the lightning conductor 28. Further, the first terminal 331a of the first resistive element 325a is electrically connected by an electrical wire 338a to the power source 36. Furthermore, the second terminal 332b of the second resistive element 325b is connected by an electrical wire 338b to the power source 16.

In comparison to the case of FIG. 5, for the electrical connection of FIG. 7 two surge protection devices 334a, 334b are required for two resistive elements 325a, 325b.

FIG. 8 shows an example of four resistive elements 425a, 425b, 425c, 425d connected in series for which three surge protection devices 434a, 434b, 434c and two electrical wires 433a, 433b are used for electrically connecting the resistive elements 425a, 425b, 425c, 425d with the lightning conductor 28.

FIGS. 9 and 10 show examples with an odd number m of resistive elements 525a-525c and 625a-625c. In this case, the number q of required surge protection devices is an even number fulfilling the equation q=[(m−1)/2]+1.

In the example of FIG. 9, for lightning protection, three resistive elements 525a, 525b, 525c are electrically connected to the lightning conductor 28 using two surge protection devices 534a, 534b and two electrical wires 533a, 533b.

Furthermore, for thermal welding in addition three electrical wires 537, 538a, 538b are used as illustrated in FIG. 9.

The example of FIG. 10 is a variant of the example of FIG. 9 with a different arrangement of the surge protection devise 634a, 634b. However, the number of used resistive elements 625a, 625b, 625c and the number of used surge protection devise 634a, 634b is the same as for FIG. 10.

To conclude, the resistive elements which were used for the welding process and are left in the blade 3 as a remnant of the welding process are integrated into the lightning protection system of the blade 3. Hence, flashovers during lightning between the resistive elements and the lightning conductor 28 can be prevented. In embodiments, in the case of high voltages at the lightning conductor 28 caused by a lightning strike of the blade 3, the surge protection devices each open a pathway for the lightning current to flow via the resistive elements. Hence, large voltage differences between the resistive elements and the lightning conductor 28 are prevented.

Moreover, as the electrical connection between the resistive elements and the lightning conductor 28 are installed before the welding process for joining the blade components, they can be easier installed.

Figure 11:
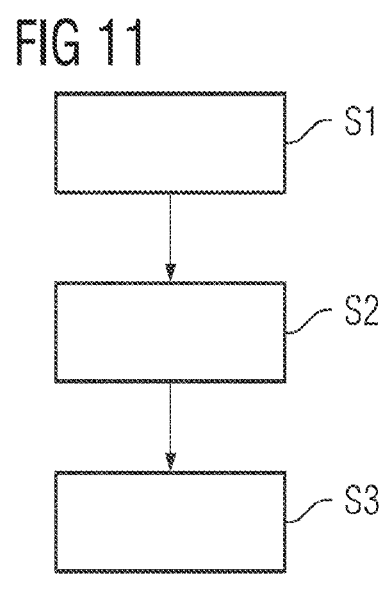

In the following, a method for manufacturing a wind turbine blade is described with reference to FIG. 11.

In a first step S1 of embodiments of the method a first and a second blade component (for example, the shear web 13 and the upper shell 10, FIG. 2) are arranged such that they overlap with each other in an overlap region 24 (FIG. 3). Further, a resistive element 25 is arranged between the first and second blade components 10, 13 in the overlap region 24. The resistive element 25 has a first and a second terminal 31, 32 (FIG. 4). Furthermore, a lightning conductor 28 is arranged such that it is electrically connected with each of the first and second terminals 31, 32, wherein the lightning conductor 28 is electrically connected to one of the first and second terminals 31, 32 via a surge protection device 34.

In a second step S2 of embodiments of the method, the first and second blade components 10, 13 are connected to each other by thermal welding. Thermal welding includes supplying an electrical current I between the first and second terminals 31, 32 of the resistive element 25 for heating the resistive element 25.

In embodiments, each of the first and second terminals 31, 32 is electrically connected with a power source 26 for supplying the electrical current I between the first and second terminals 31, 32. Further, a voltage applied by the power supply (e.g., 690 V or less) is at or below a threshold voltage $V_{th}$ of the surge protection device 34 (e.g., 2.5 kV or more). Hence, the surge protection device 34 provides an electrical isolation between the one of the first and second terminals 31, 32 of the resistive element 25 and the lightning conductor 28. In addition, the electrical current I for heating the resistive element 25 is supplied through the electrical connection between the other one of the first and second terminals 31, 32 of the resistive element 25 and the lightning conductor 28.

In a third step S3 of embodiments of the method, the electrical connection between each of the first and second terminals 31, 32 and the power source 36 is removed.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, comprising:
a first blade component and a second blade component connected with each other in an overlap region by thermal welding;
a resistive element arranged between the first blade component and the second blade component in the overlap region as a remnant of the thermal welding, the resistive element having a first terminal and a second terminal;
a lightning conductor electrically connected with each of the first terminal and the second terminal; and
a surge protection device, wherein one of the first terminal and the second terminal is electrically connected with the lightning conductor via the surge protection device.

2. The wind turbine blade according to claim 1, wherein the surge protection device is configured to:
provide a closed electrical connection between the respective terminal of the resistive element and the lightning conductor for lightning protection when a voltage applied to the surge protection device exceeds a threshold voltage, and
provide an electrical isolation between the respective terminal of the resistive element and the lightning conductor) for thermal welding of the first blade component and the second blade component when the applied voltage is at or below the threshold voltage.

3. The wind turbine blade according to claim 2, wherein the threshold voltage is 1.5 kV, 2 kV, 2.5 kV, 3 kV, 10 kV, or 30 kV.

4. The wind turbine blade according to claim 1, wherein only one of the first terminal and the second terminal is connected to the lightning conductor via a surge protection device and the other one of the first terminal and the second terminal is connected to the lightning conductor by an electrical wire.

5. The wind turbine blade according to claim 1, wherein the resistive element is an elongated element extending in a longitudinal direction and having a first end and a second end with respect to the longitudinal direction, and the first terminal is arranged at the first end and the second terminal is arranged at the second end.

6. The wind turbine blade according to claim 1, wherein the overlap region of the first blade component and the second blade component is an elongated region arranged parallel to a longitudinal direction of the wind turbine blade and/or the resistive element is an elongated element arranged parallel to the longitudinal direction of the wind turbine blade.

7. The wind turbine blade according to claim 1, comprising at least one additional resistive element having a first terminal and a second terminal, wherein the second terminal of the resistive element is electrically connected to the first terminal of the at least one additional resistive element in series.

8. The wind turbine blade according to claim 7, wherein the second terminal of the resistive element and the first terminal of the at least one additional resistive element are electrically connected with the lightning conductor by a common conductive wire and/or by a common surge protection device.

9. The wind turbine blade according to claim 7, comprising an even number n of the resistive elements, and a number p of surge protection devices, wherein p is an even number fulfilling equation $p=(n/2)$ or p is an odd number fulfilling equation $p=(n/2)+1$.

10. The wind turbine blade according to claim 7, comprising an odd number m of the resistive elements and a number q of surge protection devices, wherein q is an even number fulfilling equation $q=[(m-1)/2]+1$.

11. The wind turbine blade according to claim 1, wherein the first blade component and/or the second blade component comprises a lower blade shell, an upper blade shell, a pressure side shell, a suction side shell, and/or a shear web.

12. A method for manufacturing a wind turbine blade, comprising:
a) arranging a first blade component and a second blade component such that the first blade component and the second blade component overlap with each other in an overlap region, wherein a resistive element is arranged between the first blade component and the second blade component in the overlap region, the resistive element has a first terminal and a second terminal, a lightning conductor is arranged such that the lightning conductor is electrically connected with each of the first terminal and the second terminal, and the lightning conductor is electrically connected to one of the first terminal and the second terminal via a surge protection device; and
b) connecting the first blade component and the second blade component to each other by thermal welding including supplying an electrical current between the first terminal and the second terminal of the resistive element for heating the resistive element.

13. The method according to claim 12, wherein a voltage applied at the surge protection device in step b) is at or below a threshold voltage such that:
the surge protection device provides an electrical isolation between the one of the first terminal and the second terminal of the resistive element and the lightning conductor, and
the electrical current for heating the resistive element is supplied through electrical connection between the other one of the first terminal and the second terminal of the resistive element and the lightning conductor.

14. The method according to claim 12, wherein each of the first terminal and the second terminal are electrically connected by an electrical connection in step b) with a power source for supplying the electrical current between the first terminal and the second terminal.

15. The method according to claim 14, comprising a step of removing the electrical connection between each of the first terminal and the second terminal and the power source after step b).

* * * * *